United States Patent Office 2,853,734
Patented Sept. 30, 1958

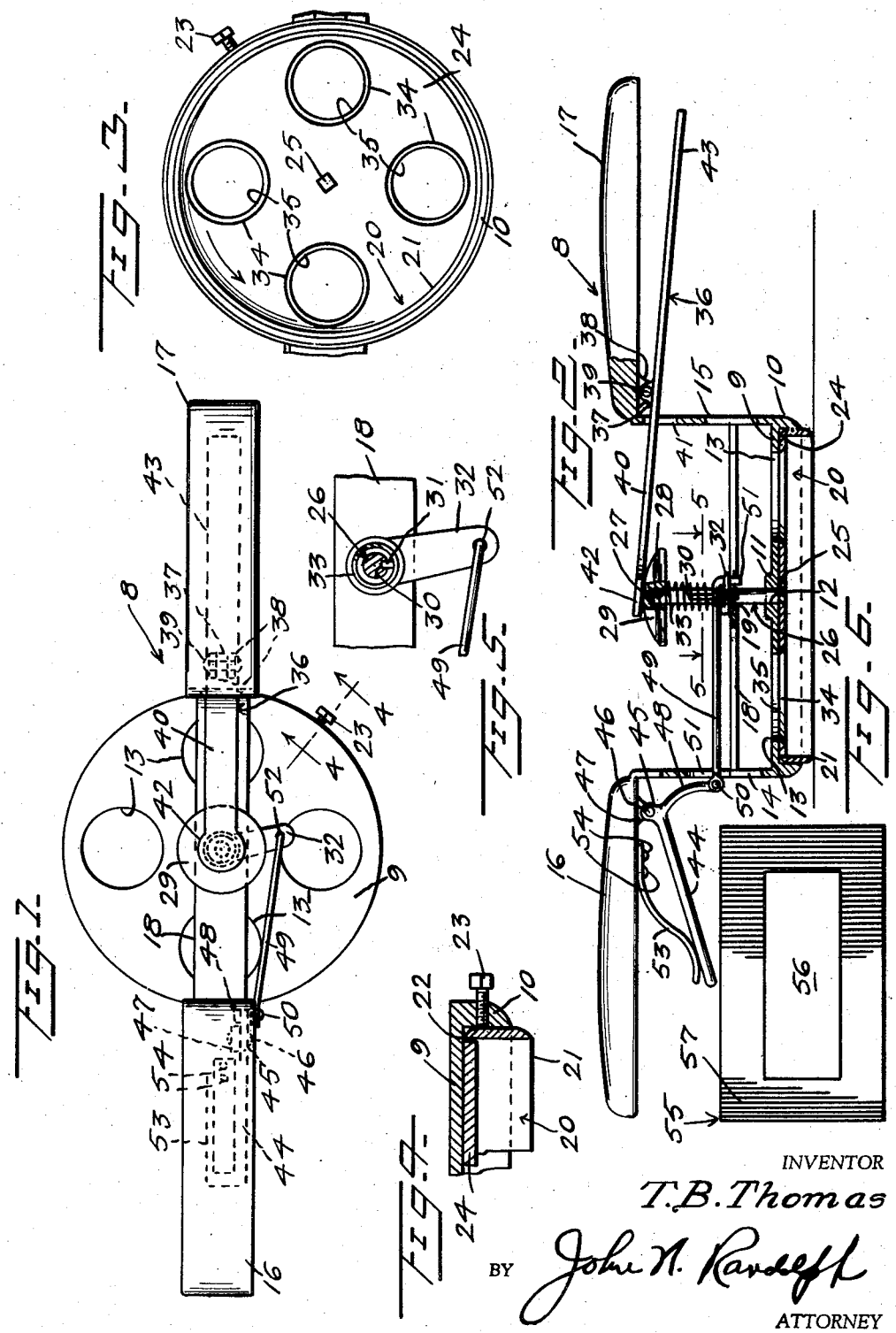

2,853,734

MACHINE FOR MAKING HAMBURGER PATTIES

Theodore B. Thomas, New London, Wis.

Application September 20, 1957, Serial No. 685,294

9 Claims. (Cl. 17—32)

This invention relates to a novel machine of extremely simple construction which may be effectively utilized for quickly and easily producing patties of uniform weight and shape from hamburger or other ground meat.

More particularly it is an aim of the present invention to provide a machine of extremely simple construction which will function to flatten ground meat to form a patty of uniform thickness while at the same time cutting off any projections of the meat so that the patty will be substantially circular, after which portions of the patty of excess thickness can be sheared off and extracted by the machine, and the patty thereafter projected from the machine onto a piece of wax paper, all of which operations can be accomplished without touching the meat with the hands.

Still a further object of the invention is to provide a meat patty forming machine including an interchangeable part which may be readily replaced causing the machine to produce meat patties of different thicknesses and weights.

Various other objects and advantages of the invention will hereinafter become more fully apparent from the following description of the drawing, illustrating a presently preferred embodiment thereof, and wherein:

Figure 1 is a plan view of the meat patty forming machine;

Figure 2 is an enlarged substantially central longitudinal sectional view partly in side elevation thereof;

Figure 3 is a fragmentary bottom plan view of the machine;

Figure 4 is an enlarged detailed sectional view taken substantially along a plane as indicated by the line 4—4 of Figure 1;

Figure 5 is an enlarged fragmentary horizontal sectional view in detail, taken substantially along a plane as indicated by the line 5—5 of Figure 2, and Figure 6 is a plan view on a much reduced scale of a board for use with the patty forming machine of Figures 1 to 5.

Referring more specifically to Figures 1 to 5 of the drawing, the patty forming machine in its entirety is designated generally 8 and includes a disk 9 having a relatively thick depending annular flange 10. The disk 9 has an upstanding centrally disposed boss 11 and is provided with a central bore 12 extending therethrough and through the boss 11. The disk 9 is provided with a plurality of relatively large openings 13 disposed around the boss 11 and in equally spaced relation to one another. Two bars 14 and 15 are fixed to and extend upwardly from diametrically opposed peripheral portions of the disk 9 and have outturned extensions at their upper ends forming handles 16 and 17, respectively. The handles 16 and 17 extend in directions away from one another and are disposed substantially in alignment, as seen in Figures 1 and 2. A bar 18 extends between and is connected at its ends to the bars or uprights 14 and 15 and is disposed above but adjacent the disk 9. The bar 18 is provided with an opening 19 which aligns with the bore 12.

An annular or ring-shaped blade 20 fits detachably in the flange 10 and is externally beveled at both side edges to form annular cutting edges 21 and 22. The blade is of a width greater than the width of the flange 10 so that when fully seated in said flange and against the underside of the plate or disk 9, one annular edge portion of the blade 20 will extend downwardly from the bottom edge of the flange 10. As seen in Figures 2 and 4, the cutting edge 21 is disposed in an exposed operative position substantially below the flange 10. A screw 23 is threaded radially inward through the flange 10 to bear against a portion of the exterior of the blade 20 for clamping said blade within the flange 10. It will be obvious that by loosening the screw 23 the blade 20 can be removed and reversed for positioning the other cutting edge 22 in a lowermost operative positon.

A disk shaped ejector plate 24 fits slidably and rotatably within the blade 20 and has a relatively close fitting engagement therewith, as best seen in Figure 4. An end 25 of a shaft 26 extends through and is secured in the center of the plate 24 so as to be disposed flush with the underside thereof. The shaft 26 extends upwardly from the plate 24 slidably through the bore 12 and opening 19 and has a threaded upper end 27 which threadedly engages in a downwardly opening socket 28 of a head or knob 29 which is thus detachably mounted on the upper end of the shaft 26. The shaft 26 is provided with a keyway 30 to receive a key 31 by which a lever arm 32 is slidably keyed to the shaft 26. The lever arm 32 rests upon the upper side of the bar 18 and normally extends from the shaft 26 outwardly with respect to one side edge of the bar 18, as best seen in Figure 5. A compression spring 33 is mounted on the shaft 26 and has a lower end bearing against the arm 32 and an upper end bearing against the underside of the head 29. The spring 33 urges the shaft 26 upwardly to normally maintain the head 29 substantially above the bar 18 for retaining the ejector plate 24 against the underside of the disk 9. The ejector plate 24 is provided with openings 34 which are beveled toward the upper edges 35 of said openings to define cutting edges which are of a diameter corresponding to the diameter of the openings 13. The openings 34 correspond in number with the openings 13 and are disposed so that said openings 34 may be moved into full registration with the openings 13, as seen in Figures 1, 2 and 3.

A lever 36 has an upstanding apertured ear 37 intermediate of its ends which fits loosely between depending apertured ears 38 which extend downwardly from the handle 17, adjacent the inner end thereof. A pivot pin 39 extends through aligned apertures of the ears 37 and 38 for pivotally mounting the lever for vertical rocking movement. One end 40 of the lever 36 extends loosely through a vertically elongated opening 41 of the upright 15 and has an outer end portion 42 bearing on the head 29. Another end 43 of the lever 36 is disposed beneath and longitudinally of the handle 17 and is normally spaced therefrom, as seen in Figure 2, when the ejector plate 24 is in a raised and retracted position.

A trigger 44 has an upstanding apertured ear 45 which is pivotally connected by a pivot pin 46 to an ear 47 which depends from the handle 16, near the inner end of said handle. The trigger 44 normally extends outwardly and downwardly from the ear 45, relative to the handle 16. The trigger 44, at its inner end, is provided with a downwardly curved lever portion 48 which extends downwardly from the ear 45 generally toward the outer side of the bar 14. One end of a connecting rod 49 is connected by a pivot pin 50 to the lower end of the trigger extension 48. Said connecting rod 49 extends from the pivot pin 50 through a notch 51 in one side edge of the upright 14 and has an opposite downturned end 51 which turnably fits in an opening 52 in the outer end of the arm 32. One end of a leaf spring 53 is secured by fastenings 54 to the underside of the handle 16. The leaf spring 53 extends outwardly and downwardly from its secured end and has a free end portion bearing against the trigger 44 for urging the trigger to swing downwardly about the pivot 46. Downward swinging movement of the trigger 44 is limited by engagement of an end of the pin 50 with a part of the upright 14, whereby the ejector plate 24 is normally retained by said spring 53 and stop 50, 14 with the openings 34 in alignment with the openings 13.

The patty forming machine 8 is preferably utilized with a board 55 as shown in Figure 6 having a smooth flat top surface portion 56 onto which is placed a proper amount of hamburger or other ground meat to make a patty of desired weight. The machine 8 is placed on the hamburger or ground meat, not shown, so that the blade 20 substantially surrounds the hamburger. The machine is then pressed downwardly by pressure exerted on the handles 16 and 17 until the cutting edge 21 contacts the board surface 56. Should any part of the hamburger be wider than the diameter of the cutting edge 21, the excess marginal portion of the meat will be cut off by the cutting edge 21 as it approaches the board surface 56. If the volume of the hamburger is such as to more than fill the space within the blade 20 between its cutting edge 21 and the ejector plate 24, the excess meat will be forced upwardly through the aligned openings 34 and 13. The operator then exerts a squeezing pressure on the handle 16 and trigger 44 to swing the trigger upwardly for exerting a pull on the connecting rod 49 to turn the crank arm 32 and shaft 26 for rotating said shaft and the ejector plate 24 clockwise as seen in Figure 1 or counterclockwise as seen in Figure 3. This will cause the circular cutting edges 35 to cutoff the excess meat which projects through the openings 13. The handles 16 and 17 can also be utilized for turning the entire machine, while resting on the surface 56, for completely severing the excess meat through which the cutting edge 21 passed. The machine 8 is then slid to position the knife 20 over a serrated top surface portion 57 of the board 55 so that the formed patty, not shown, will not stick to the board 55 when the machine is then lifted. The machine 8 after being lifted off of the board 55 is placed over a sheet of wax paper, not shown, and the handle 43 is swung upwardly toward the handle 17 by gripping engagement of said parts to cause the lever 36 to exert a downward thrust on the head 29 for displacing the shaft 26 and ejector plate 24 downwardly. The ejector plate 24 will thus be forced downwardly through the blade 20 to eject the patty therefrom onto the wax paper disposed therebeneath. By releasing the lever handle 43 the shaft 26 and ejector plate 24 will be returned to their retracted raised positions of Figure 2 and by releasing the trigger 44, the spring 53 is permitted to swing the trigger back to its position of Figure 2 to turn the shaft 26 and ejector plate 24 counterclockwise as seen in Figure 1 or clockwise as seen in Figure 3 to realign the openings 34 with the openings 13. Engagement of the pin 50 with the upright 14 will stop turning movement of the shaft 26 and plate 24 when the openings 34 are in registration with the openings 13.

Where the meat is quite juicy the ejector plate 24 can be held with the openings 34 out of alignment with the openings 13 while the patty is being compressed within the blade 20 and beneath the ejector plate 24 to effect a more tight compressing of the patty and to minimize the loss of the juices therefrom.

Blades 20 of different widths may be interchangeably utilized for making meat patties of different thicknesses and weights.

Various other modifications and changes are contemplated and may be resorted to, without departing from the function or scope of the invention as hereinafter defined by the appended claims.

I claim as my invention:

1. A machine for forming meat patties comprising a disk having a depending annular flange, a ring-shaped blade mounted in said flange and having an annular bottom cutting edge disposed beneath and spaced from the flange, an ejector plate loosely disposed within said blade, a shaft fixed to and extending upwardly from the center of said ejector plate, said disk having a central bore in which said shaft is slidably disposed, a knob connected to the upper end of said shaft, a compression spring mounted on the shaft above said disk and having an upper end bearing against the underside of the knob for yieldably urging the shaft upwardly to normally maintain the ejector plate against the underside of said disk, and handle means connected to peripheral portions of said disk for manually supporting the machine, said ejector plate being displaced downwardly through the blade to a projected position by a downward pressure exerted on said knob against the resistance of the compression spring.

2. A machine for forming meat patties as in claim 1, said shaft being rotatable in the disk bore, said disk and ejector plate having spaced openings, the openings of the ejector plate being movable into and out of registration with the openings of the disk by rotation of the shaft and ejector plate.

3. A machine for forming meat patties as in claim 2, the openings of said ejector plate being beveled to provide cutting edges at the upper side of the ejector plate for executing a shearing cut with the openings of the disk when the ejector plate is turned relative to the disk.

4. A machine for forming meat patties as in claim 3, and a crank arm keyed to and projecting laterally from said shaft for turning the shaft and ejector plate.

5. A machine for forming meat patties comprising a disk having a central bore and a depending annular marginal flange, a ring-shaped blade mounted in said flange of a width greater than the width of said flange and having an annular bottom cutting edge disposed below the bottom edge of the flange, bars fixed to and extending upwardly from circumferentially spaced portions of the disk, handles extending outwardly from upper ends of said bars, a bar extending between and supported by said first mentioned bars above and spaced from the disk, and having an opening aligning with the disk bore, an ejector plate loosely mounted within the blade, a shaft fixed to and extending upwardly from the center of said plate and slidably and turnably disposed in the bore and bar opening, a head connected to the upper end of said shaft above and spaced from said last mentioned bar, a compression spring disposed between said last mentioned bar and head for urging the shaft and ejector plate upwardly to normally maintain the ejector plate against the underside of said disk, and a lever pivotally supported intermediate of its ends beneath the inner end of one of the handles and having one end bearing on the head and on opposite handle end disposed beneath and spaced from said handle and displaceable upwardly toward the handle for rocking the lever for exerting a downward thrust on the head and shaft for displacing the ejector plate downwardly through the blade.

6. A machine for forming meat patties as in claim 5, a crank arm, means slidably keying said crank arm to the shaft, said crank arm normally projecting laterally from one side edge of the last mentioned bar and being disposed between said bar and the lower end of the compression spring, a trigger member pivotally mounted beneath the other handle, a connecting rod connecting said trigger member and crank arm for turning the shaft in one direction when the trigger member is swung upwardly and toward the last mentioned handle, said disk and ejector plate having normally aligned openings, and the openings of said ejector plate being rotatable out of registration with the disk openings by manipulation of the trigger member for turning the shaft.

7. A machine for forming meat patties as in claim 6, a spring supported by the last mentioned handle and bearing against the trigger member for rotating the shaft and the ejector plate in the opposite direction, and means forming an abutment for limiting swinging movement of the trigger member through the biasing action of said last mentioned spring and cooperating with said spring for returning the ejector plate to a position with the openings thereof in registration with the disk openings.

8. A machine for forming meat patties as in claim 7, the openings of said ejector plate being beveled to provide cutting edges on the upper side of the ejector plate for executing a shearing cut with the disk openings as the ejector plate is turned relative to the disk.

9. A machine for forming meat patties as in claim 5, fastening means threadedly mounted in said flange and engaging said blade for detachably mounting the blade in the flange.

No references cited.